United States Patent [19]

Lawson

[11] 4,428,617

[45] Jan. 31, 1984

[54] BOAT SEAT FISHING ACCESSORY-ARM REST SUPPORT ASSEMBLY

[76] Inventor: Jack O. Lawson, R.D. #4, Ephrata, Pa. 17522

[21] Appl. No.: 300,382

[22] Filed: Sep. 8, 1981

[51] Int. Cl.³ .............................................. A47C 7/62
[52] U.S. Cl. ................................. 297/188; 297/349; 297/414; 297/217; 114/363
[58] Field of Search ............... 297/188, 192, 194, 416, 297/430, 431, 217, 349; 114/363; 4/579

[56] References Cited

U.S. PATENT DOCUMENTS

| | | |
|---|---|---|
| 1,406,571 | 2/1922 | McCoy . |
| 2,264,744 | 12/1941 | Dunnam . |
| 2,555,073 | 5/1951 | Zdankoski ...................... 43/54.5 R |
| 2,607,398 | 8/1952 | Andrews . |
| 2,877,828 | 3/1959 | Barnette . |
| 3,077,327 | 2/1963 | Batte et al. . |
| 3,159,423 | 12/1964 | Gilbert . |
| 3,623,766 | 11/1971 | Funk . |
| 3,718,365 | 2/1973 | Gibson ............................ 114/363 X |
| 4,071,219 | 1/1978 | Seager ............................. 297/188 X |
| 4,106,811 | 8/1978 | Hernandez ...................... 297/188 X |

FOREIGN PATENT DOCUMENTS 1165671 10/1958 France .

Primary Examiner—William E. Lyddane
Assistant Examiner—Peter R. Brown
Attorney, Agent, or Firm—Samuel M. Learned, Jr.

[57] ABSTRACT

A boat seat fishing accessory-arm rest support assembly for use in combination with a fishing boat pedestal mounted swivel seat to provide in the selective convertable employment thereof either a boat seat fishing accessory support assembly to conveniently receive in detachable connection thereto fishing tackle and equipment holding containers and thereby facilitate ease of access thereto thus reducing the necessity for movement in a boat while fishing, or in alternate use interchangeably provide a boat seat arm rest support assembly thereby enhancing the boat seat comfort features.

36 Claims, 11 Drawing Figures

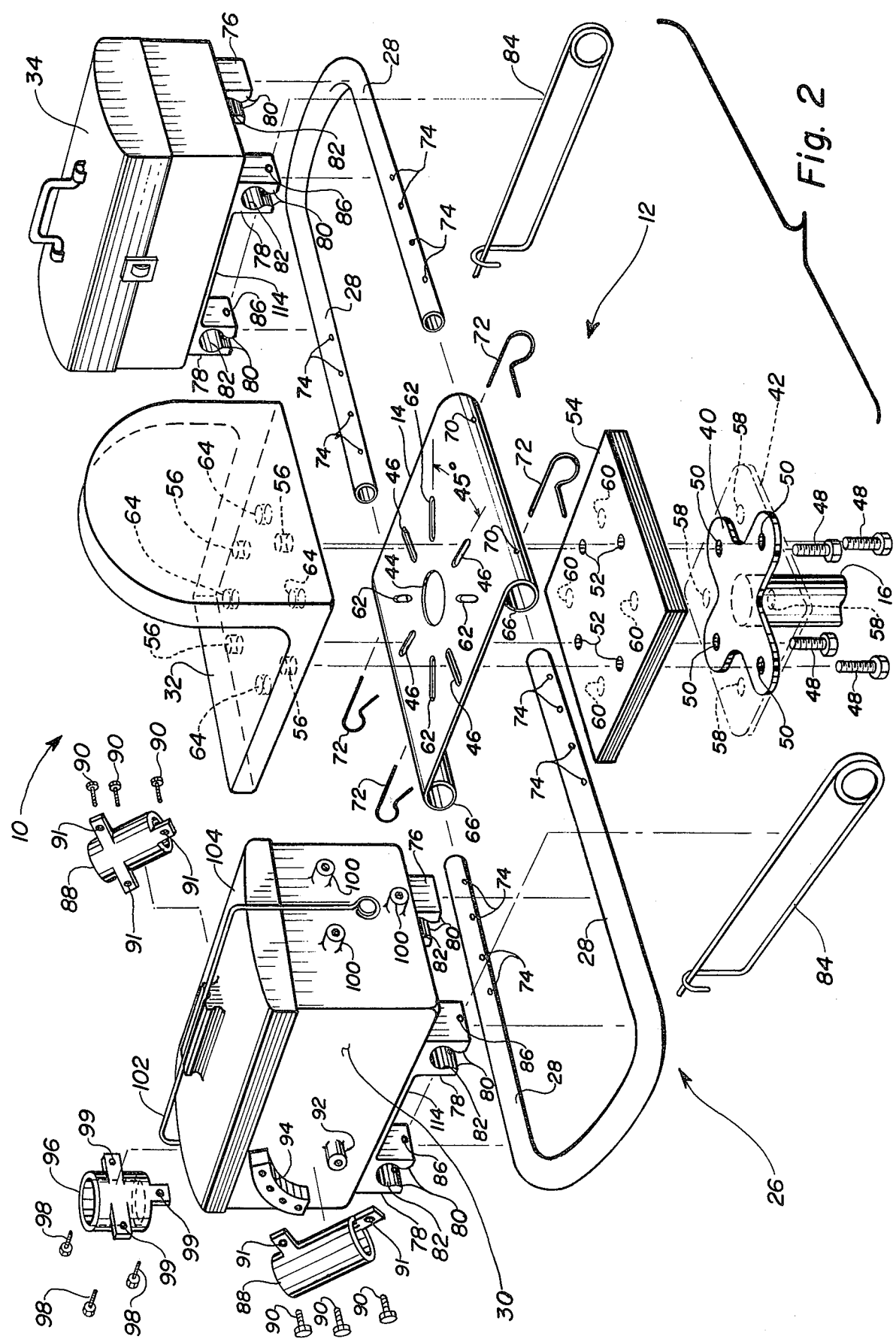

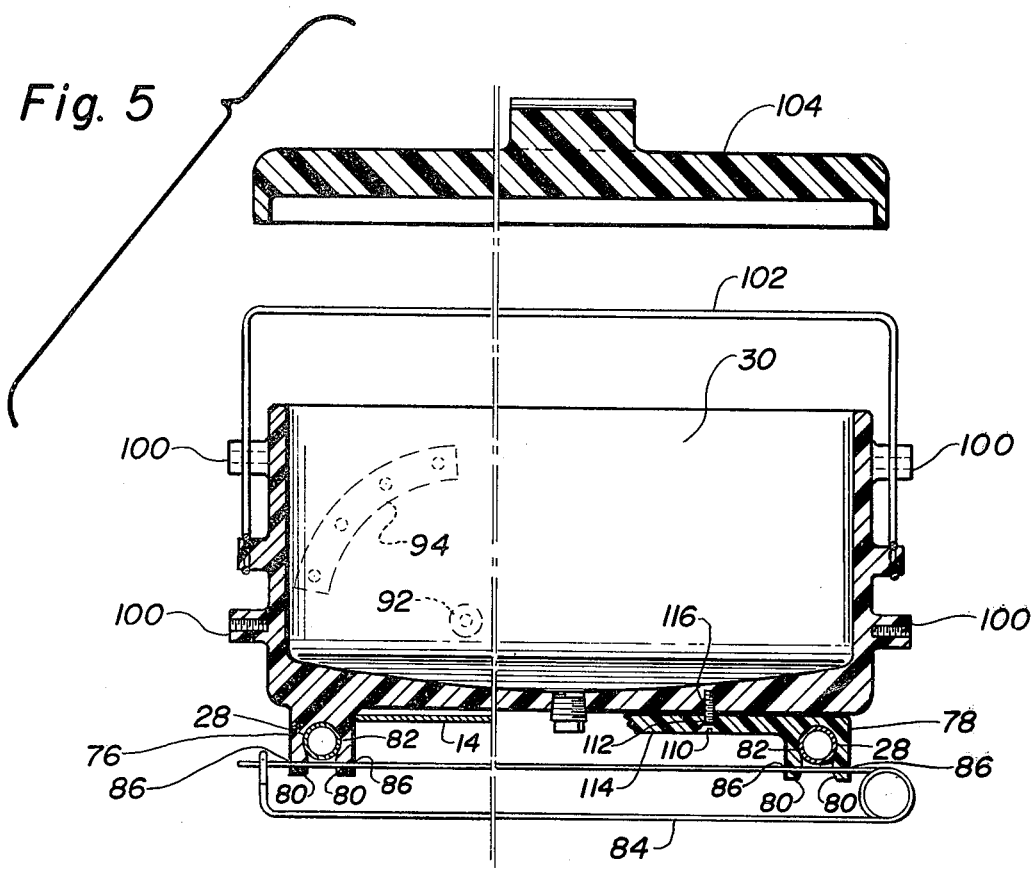
Fig. 5
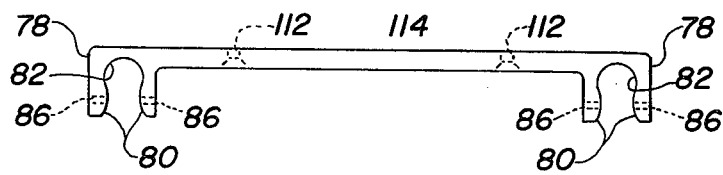
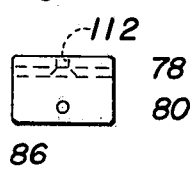
Fig. 6    Fig. 7
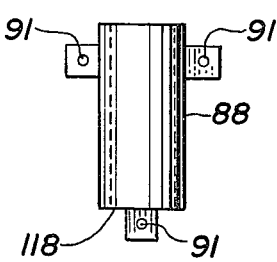
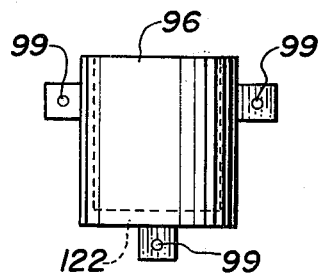
Fig. 8    Fig. 10
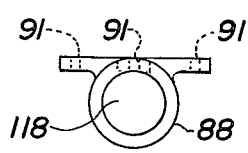
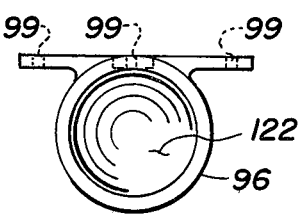
Fig. 9    Fig. 11

BOAT SEAT FISHING ACCESSORY-ARM REST SUPPORT ASSEMBLY

BACKGROUND OF THE INVENTION

The instant invention relates to a boat seat fishing accessory-arm rest support assembly wherein the same in combination with a fishing boat deck-affixed pedestal mounted swivel seat such as at present is popularly installed for sports fishing use upon the so-called "Bass Boat" watercraft class enables both enhanced seat utility and convenience features for the basic cushion and back rest structure through convertable employment of either the tackle and equipment fishing accessory support assembly embodiment of the instant invention, or alternately the boat seat arm rest support assembly embodiment thereof.

Fishing seat supports of various types with tackle accessory attachment embodiments have long been known, exemplary of which would be the portable fishing stools with rod holders as respectively shown in U.S. Pat. No. 2,607,398 to Andrews dated Aug. 19, 1952, and U.S. Pat. No. 2,877,828 to Barnette, Jr., dated Mar. 17, 1959, and portable fishing seats per se with rod holder support means as respectively shown in U.S. Pat. No. 3,623,766 to Funk dated Nov. 30, 1971, and U.S. Pat. No. 4,106,811 to Hernandez dated Aug. 15, 1978.

In U.S. Pat. No. 2,555,073 to Zdankoski dated May 29, 1951, there is taught a portable fishing seat of foldable construction with rod holders and tackle box combined therewith, and the teaching of Dunnam in U.S. Pat. No. 2,264,744 dated Dec. 2, 1941, shows a portable fishing chair of rigid construction supporting a fishing accessory tackle box as an integral part of the structure thereof as contrasted to the teaching of Batte et al in U.S. Pat. No. 3,077,327 showing a foldable portable fishing chair embodying as integrally supported features thereof a tackle box and dual rod holder means, and the teaching of McCoy in U.S. Pat. No. 1,406,571 dated Feb. 14, 1922, shows a pedestal mounted pivotal fishing chair with an integral rod support means said chair being adapted for affixment to a boat deck.

In the tackle and equipment fishing accessory support assembly embodiment of the instant invention there are provided seat-bilateral support rods for removable attachment of tackle and accessory containers thereto in which functional regard the respective teachings of U.S. Pat. No. 3,159,423 to Gilbert dated Dec. 1, 1964, showing a convertable furniture chair supporting seat-bilateral storage compartments, and French Pat. No. 1,165,671 to Allard-Meyer dated Oct. 28, 1958, showing a folding sports seat with seat-bilateral frame supporting depending pouch means, are of pertinence.

It should be understood that some of the features of the instant invention have, in some cases, structural and functional similarities to teachings separately set forth in the prior art disclosures heretofore cited and briefly discussed. However, as will hereinafter be pointed out, the instant invention is distinguishable from said earlier inventions in one or more ways in that the present invention has utility features and new and useful advantages, applications, and improvements in the art of boat seat fishing accessory-arm rest support assemblies not heretofore known.

SUMMARY OF THE INVENTION

It is the principal object of the present invention to provide a boat seat fishing accessory-arm rest support assembly whereby the same in combination with a fishing boat pedestal mounted swivel seat enables the selective alternative convertable use thereof for utility as either a boat seat fishing accessory support assembly or a boat seat arm rest support assembly.

It is another object of the present invention to provide a boat seat fishing accessory-arm rest support assembly having a fishing accessory-arm rest support assembly attachment plate adapted to be employed in connectable interposition between a pedestal mounted boat seat cushion and cushion bottom compressively assembled by bolts to either a pedestal mounted seat support spider or alternatively a seat plate support member.

It is a further object of the present invention to provide a boat seat fishing accessory-arm rest support assembly which in either of its alternately convertable use applications enhances the basic boat seat utility whether employed as a fishing accessory support assembly or a boat seat arm rest support assembly.

Still another object of the present invention is to provide a boat seat fishing accessory-arm rest support assembly whereby a fisherman when utilizing the fishing accessory support assembly alternative embodiment thereof may with facilitated proximity and access to his tackle and equipment holding containers assembled thereto, thereby with a reduced need for movement in the boat, and with greater convenience and comfort, participate in fishing from a boat having pedestal mounted swivel seats equipped with said fishing accessory-arm rest support assembly.

An additional object of the present invention is to provide a boat seat fishing accessory-arm rest support assembly wherein the fishing accessory support assembly alternative embodiment thereof is adapted to receive tackle and equipment holding containers provided with either integral support rod clamp members or containers not so provided but which have been modified by affixment thereto of auxiliary support rod clamp members.

It is also an object of the present invention to provide a boat seat fishing accessory-arm rest support assembly of relatively simple but highly durable construction which may be easily installed and beneficially utilized with ease, efficiency, and reliability of operation.

BRIEF DESCRIPTION OF THE DRAWINGS

FIG. 2 is an exploded composite view of the boat seat fishing accessory support assembly embodiment of the instant invention generally as previously shown in FIG. 1, however, herein illustrating the structural component sub-assembly connectable relationship thereof in combination with a typical fishing boat pedestal mounted swivel seat and assembly thereupon of typical tackle and equipment holding containers in detachably supportable affixment thereto.

FIG. 5 is an enlarged composite vertical longitudinal section of a beverage cooler accessory and the alternate affixment means therefor in detachably supportable attachment thereof to the accessory support rod members of the boat seat fishing accessory support assembly embodiment of the instant invention.

FIG. 6 is a side elevation of the auxiliary support rod clamp member alternate affixment means whereby a tackle or equipment holding container, or the like, not otherwise provided with integral support rod clamp members may be adapted for detachable supportable attachment utilization with the boat seat fishing accessory support assembly embodiment of the instant invention.

FIG. 7 is an end elevation of the auxiliary support rod clamp member as previously illustrated in FIG. 6.

FIG. 8 is an enlarged front elevation of a beverage cooler accessory rod holder attachment means.

FIG. 9 is a top plan view of the beverage cooler accessory rod holder attachment means as previously illustrated in FIG. 8.

FIG. 10 is an enlarged front elevation of a beverage cooler accessory beverage container holder attachment means.

FIG. 11 is a top plan view of the beverage cooler accessory beverage container holder attachment means as previously illustrated in FIG. 10.

DETAILED DESCRIPTION OF THE INVENTION

Figure 1:
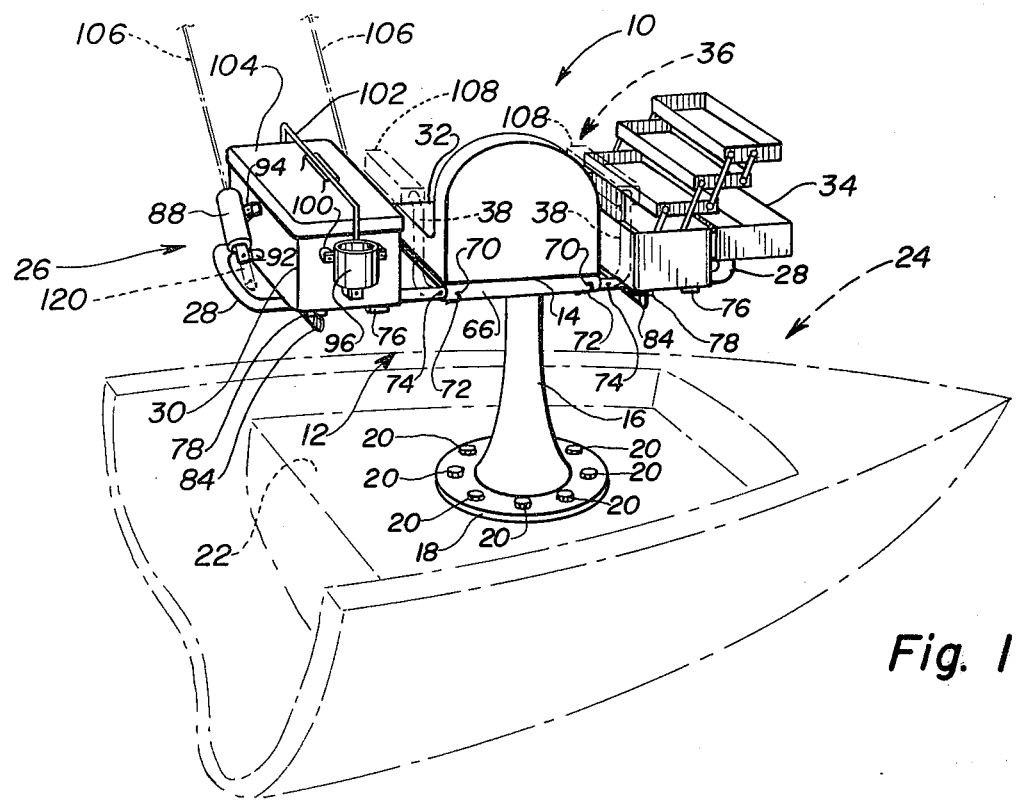
FIG. 1 is a rear perspective view of a typical fishing boat pedestal mounted swivel seat shown with the boat seat fishing accessory support assembly embodiment of the instant invention assembled thereto in providing facilitated proximity and access to typical tackle and equipment holding containers assembled thereupon in detachably supportable affixment, with the alternate boat seat arm rest support assembly embodiment of said invention being shown in convertable installation use in phantom.

Referring to FIG. 1, the present invention is shown generally in alternate use application which invention comprises a boat seat fishing accessory-arm rest support assembly 10 installed in combination with and upon a typical fishing boat pedestal mounted swivel seat 12 by means of an attachment plate 14 all of which is swivelly mounted to revolve about a vertical seat support pedestal 16 adapted at the lower end thereof by a pedestal flange 18 to be fastened by means of flange bolts 20 to a deck section 22 of a sports fishing boat 24 of the so-called "Bass Boat" watercraft class being generally that type of boat presently and popularly used for various fresh water and coastal salt water sports fishing activities, wherein the boat seat fishing accessory support assembly embodiment 26 of said present invention 10 is illustrated showing the bilaterally disposed accessory support rod members 28 thereof respectively supporting in detachable affixment thereto a typical beverage cooler 30 in bilateral close proximity disposition one side of the boat seat cushion 32 and on the other side thereof disposed in opposing close proximity detachable affixment support bilateral thereto a typical tackle box 34, and alternately shown is the boat seat arm rest support assembly embodiment 36 wherein the respective arm rest support members 38 thereof may be selectively and interchangeably employed in place of the accessory support rod members 28 as shown to provide in the alternate embodiment application enhanced swivel seat 12 close proximity bilateral arm rest comfort features. In use application the boat seat fishing accessory-arm rest support assembly 10 of instant invention provides in the boat seat fishing accessory support assembly embodiment 26 thereof a means to conveniently receive in detachable connection to the bilaterally disposed accessory support rod members 28 thereof fishing tackle and equipment holding containers generally as herein illustrated and thereby facilitate by virtue of the swivel seat 12 connected close proximity disposition ease of access thereto thus reducing the necessity for movement in a boat while fishing, and in alternate selective convertable utilization of the boat seat arm rest support assembly embodiment 36 as previously indicated provide an arm rest support assembly to thereby enhance the swivel seat 12 comfort features.

Referring now to the exploded composite view of FIG. 2 to describe in greater detail the various component parts of this invention, as well as explain further the method of installing and using the same cooperatively with a typical fishing boat pedestal mounted swivel seat 12 in the various structural alternative versions thereof, wherein as will hereinafter be more fully described the attachment plate 14 component of said invention 10 is adapted for installation upon a swivel seat 12 vertical seat support pedestal 16 which may be equipped with either a seat connecting spider 40 or alternately a seat connecting plate 42 which are presently those two seat-to-support pedestal connecting means employed in typical fishing boat pedestal mounted swivel seat 12 structures of that type herein considered.

In continued reference to FIG. 2, considering first combined installation of the boat seat fishing accessory-arm rest support assembly 10 upon a typical fishing boat pedestal mounted swivel seat 12 mounted upon a vertical seat support pedestal 16 provided with a seat connecting spider 40. As shown, the attachment plate 14 component of the instant invention 10 is common to the installation and use of both embodiments 26 and 36 thereof, and is provided with a centrally intermediate axially aligned opening 44 therein having radially spaced at regularly repeating 45° arcs longitudinally equidistant and equidistant outward therefrom a geometrically configured array of eight slotted openings wherein those four slotted openings 46 of said array being disposed within said attachment plate 14 at angles normal to the respective sides thereof are for use in assembling said invention 10 upon a vertical seat support pedestal 16 provided a seat connecting spider 40 and are adapted to receivably communicate adjustably inward or outward therethrough seat connecting bolts 48 assembled in upward insertable disposition through spider lobe openings 50 and through cushion bottom spider connecting openings 52 provided in the cushion bottom 54 into threadable communication with spider connecting seat cushion threaded sockets 56 whereby said seat connecting bolts 48 are enabled to be drawn tight to thereby engagably retain in compressive disposition between the seat connecting spider 40 and the seat cushion 32 the cushion bottom 54 and the attachment plate 14 thereabove interposed to which is convertably assembled either the bilaterally disposed accessory support rod members 28 of the boat seat fishing accessory support assembly embodiment 26 or the arm rest support members 38 of the boat seat arm rest support assembly embodiment 36 as previously shown in alternate assembly view illustration thereof in FIG. 1.

Still with reference to FIG. 2, considering second combined installation of the boat seat fishing accessory-arm rest support assembly 10 upon a typical fishing boat pedestal mounted swivel seat 12 mounted upon a vertical seat support pedestal 16 alternately provided in this case with a seat connecting plate 42 which is shown in phantom in FIG. 2 for ease and clarity of alternate illustration purposes. In this instance of invention 10 installation to a swivel seat 12 so provided the seat connecting bolts 48 are inserted through the seat connecting plate openings 58 and thereafter in vertically aligned upward insertable communication through next the cushion bottom seat connecting plate openings 60 alternately provided in the cushion bottom 54 and then inward or outward adjustably and insertably through the attachment plate alternate slotted openings 62 into threadable communication with corresponding seat connecting plate seat cushion threaded sockets 64 whereby, as before, said seat connecting bolts 48 are enabled to be drawn tight to thereby engagably retain in compressive disposition between the seat connecting plate 42 in this instance and the seat cushion 32 the cushion bottom 54 and the attachment plate 14 thereabove interposed to which in a manner as before is convertably assembled either the bilaterally disposed accessory support rod members 28 of the boat seat fishing accessory support assembly embodiment 26 or the arm rest support members 38 of the boat seat arm rest support assembly embodiment 36 as previously shown in alternate assembly view illustration thereof in FIG. 1.

Additional features of the attachment plate 14 include two rolled tubular members 66 formed integral thereto from the material thereof being configured in seat cushion 32 forward and rearward disposition and spaced at a parallelly set-apart distance sufficient to receive in insertable close communication therebetween the cushion bottom 54 for purposes of attachment plate interposed compressed installation as heretofore described. It is by means of slidable insertion bilaterally of either the accessory support rod members 28, or alternately the arm rest support rod members 68 as more clearly illustrated in FIGS. 3 and 4 to be hereinafter described in greater detail, that interchangeable installation of either the boat seat fishing accessory support assembly embodiment 26 as shown in FIG. 2, or the boat seat arm rest support assembly embodiment 36 as alternately illustrated in phantom in FIG. 1, is accomplished. It will also be noted that each of said rolled tubular members 66 is provided with a rod retaining clip hole 70 laterally near the respective ends thereof which are adapted to insertably receive rod retaining clips 72 whereby adjustable bilateral extension set and retention of either accessory support rod members 28 or arm rest support rod members 68 is accomplished by means of aligned insertable communication engagement therethrough of said rod retaining clips 72 with rod extension and set holes 74 respectively therein.

Thus for that which has been described with respect to the attachment plate 14 and the integral structure thereof relating to the slotted openings 46 and alternate slotted openings 62, the rolled tubular members 66, the rod retaining clip holes 70 and the rod retaining clips 72 for use therewith, and the method of installation of the attachment plate 14 in combination with a typical fishing boat pedestal mounted swivel seat 12 whether assembled by means of either a seat connecting spider 40 or a seat connecting plate 42 to the vertical seat support pedestal 16 therefor, is the same for both the boat seat fishing accessory support assembly embodiment 26 or the boat seat arm rest support assembly embodiment 36 of the instant invention 10, and the method of use of said rod retaining clips 72 with the rod extension and set holes 74 whether for purposes of accomplishing an adjustable bilateral extension set and retention of either the accessory support rod members 28 or the arm rest support rod members 68 of the respective embodiments hereof, is likewise the same for both of said rod members 28 and 68. Hereafter, however, it is the structural and functional differences of the respective embodiments 26 and 36 upon interchangeable uses thereof by means of said attachment plate 14 in combination with a typical fishing boat pedestal mounted swivel seat 12 which comprise the continued detailed discussion of said instant invention 10 with respect to additional illustrative matter of FIG. 2, being the boat seat fishing accessory support assembly embodiment 26 unit.

As will be further noted in FIG. 2, the respective bilaterally disposed accessory support rod members 28 are each aligned on either bilateral side of the attachment plate 14 for slidable insertion of the ends thereof longitudinally into the rolled tubular member 66 openings inwardly to that extension distance where there is accomplished coactive alignment of respectively equidistance rod extension and set holes 74 of each bilaterally disposed accessory support rod member 28 with the corresponding rod retaining clip hole 70 whereupon a rod retaining clip 72 is inserted to a snap-retained disposition thereby securing each accessory support rod member 28 at that selectively adjusted bilateral extension set desired, wherein it will be noted there are four such rod extension and set holes 74 in each accessory support rod members 28 for purposes of accomplishing such bilateral extension adjustment thereof as hereinabove described. When the foregoing is accomplished the bilateral extension adjusted assembly of said accessory support rod members 28 to the attachment plate 14 will be as previously illustrated in FIG. 1, whereupon the same, being the boat seat fishing accessory support assembly embodiment 26 of said instant invention 10, is thereupon prepared for use thereof in accomplishing detachable affixment to said bilaterally disposed accessory support rod members 28 of fishing tackle and equipment holding containers such as a typical beverage cooler 30 or typical tackle box 34 as shown.

In both instances of detachable affixment of either a typical beverage cooler 30 or a typical tackle box 34 to the bilaterally disposed accessory support rod members 28, the accomplishment thereof is by rod clamp members, which may be integral support rod clamp members 76 being formed as part of the basic beverage cooler 30 or tackle box 34 structure when manufactured, or alternately may be auxiliary support rod clamp members 78 which are separately provided items for affixment to beverage cooler 30 or tackle box 34 structures not so provided when manufactured, both of which rod clamp member types are for purposes of illustration and discussion shown in the alternate in the FIG. 2 beverage cooler 30 and tackle box 34 illustrations, and both of which rod clamp member types will be discussed in greater detail on subsequent consideration hereinafter of FIGS. 5, 6, and 7. Suffice it to say for the moment, however, that whether an integral or auxiliary support rod clamp member the same are provided at laterally spaced longitudinally positioned downward facing rod member 28 engaging locations upon the underside support surface of either a beverage cooler 30 or a tackle box 34 and are disposed so that when downwardly pressed against an intermediately positioned accessory support rod member 28 the inward facing pliable clamp fingers 80 thereof will deflectably yield outwardly to pass and then clampably engage in retention said rod member 28 within the rod retaining clamp opening 82 thereof as respectively shown in FIG. 1 previously discussed and in FIG. 5 to be hereinafter discussed.

There may also be provided a support rod clamp member safety retaining pin 84 adapted to pass through support rod clamp member retaining pin holes 86 and below the accessory support rod members 28 after detachable affixment of either a tackle box 34 thereto as shown in FIG. 1, or a beverage cooler 30 as respectively shown in FIG. 1 and FIG. 5, to thereby provide positive mechanical retention of an attached beverage cooler 30 or tackle box 34 so the same will not accidentally detach from the accessory support rod members 28 consequent from motor vibration or the like during boat movement or otherwise.

Additional features shown in FIG. 2 pertain specifically to the beverage cooler 30 and various other accessory attachments therefor, being a set of rod holders 88 affixed by means of rod holder screws 90 inserted through rod holder attachment tab opening 91 to an integrally formed rod holder pivot lug 92 and then at the desired forward facing angularly disposition by further affixment to the integrally formed rod holder affixment arcuate lug 94. Also provided as an accessory attachment is a beverage container holder 96 affixed by means of beverage container holder screws 98 inserted through beverage container holder attachment tab openings 99 to integrally formed beverage container affixment lugs 100, the upper two of which function additionally as beverage container handle stops during arcuate deflection of the beverage container handle 102 for purposes of removal or replacement of the beverage container top 104 as more clearly shown in FIG. 5. Employment of said rod holders 88 to support fishing rods 106 in use application of the boat seat fishing accessory support assembly embodiment 26 of the instant invention 10 is as shown in FIG. 1.

Figure 3:
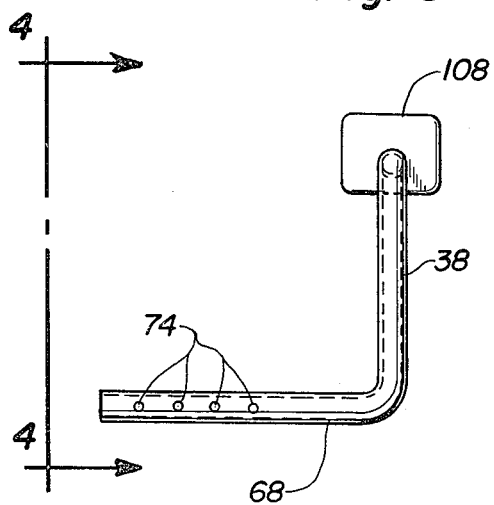
FIG. 3 is an end elevation of an arm member of the boat seat arm rest support assembly embodiment of the instant invention.
Figure 4:
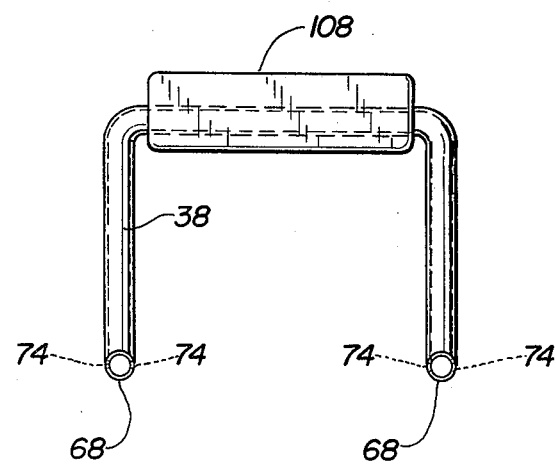
FIG. 4 is a side elevation view of the arm member shown in FIG. 3 as seen along the line 4—4 thereof.

Prior to further detailed consideration of the beverage cooler 30 and both the integral and auxiliary support rod clamp members 76 and 78 in typical alternate use application therewith, attention is directed to FIGS. 3 and 4 for further detailed consideration of the arm rest support members 38 of the boat seat arm rest support assembly embodiment 36 of said instant invention 10, wherein as respectively shown in end and side elevation views in FIGS. 3 and 4 the arm rest support rod members 68 are likewise provided with rod extension and set holes 74 for purposes of accomplishing interchangeability with the boat seat fishing accessory support assembly embodiment 26 by removal of the former from the attachment plate 14 and aligned bilateral slidable insertion therefor of said arm rest support rod members 68 into the attachment plate 14 rolled tubular member 66 openings inwardly to that extension distance where there is accomplished coactive alignment of respectively equidistance insertion said rod extension and set holes 74 of each bilaterally disposed arm rest support member 38 with the corresponding rod retaining clip hole 70 whereupon a rod retaining clip 72 is inserted to a snap-retained disposition thereby securing interchangeably each arm rest support member 38 at that selectively adjusted bilateral extension set desired. When the foregoing is accomplished the bilateral extension adjusted assembly of said arm rest support members 38 to the attachment plate 14 will be interchangeably completed as previously illustrated in phantom in FIG. 1, whereupon the same, being the boat seat arm rest support assembly embodiment 36 of said instant invention 10 is thereupon prepared for use thereof in providing enhanced boat seat comfort features, wherein it will be noted that each of said arm rest support members 38 is provided about the horizontally rod connecting portion thereof with an arm rest cushion 108.

Preferably, the instant invention 10 in both the boat seat fishing accessory support assembly embodiment 26 and the boat seat arm rest support assembly embodiment 36 thereof, with auxiliary support rod clamp means as disclosed and illustrated in FIGS. 1 through 4 hereof, are constructed or formed from corrosive and high impact resistant metals or plastics, but any other suitable materials or combinations thereof may be used.

The enlarged composite vertical longitudinal section of a typical beverage cooler 30 as illustrated in FIG. 5 shows with greater clarity some of the auxiliary components of said instant invention 10, being namely the integral support rod clamp member 76 having been formed in manufacture as a homogeneous part and extension of the beverage cooler 30 underside body surface, and alternately the auxiliary support rod clamp members 78 for use in adapting a beverage cooler, or tackle box as shown in FIG. 1, for use with the boat seat fishing accessory support assembly embodiment 26 by providing a set of inward facing pliable clamp fingers 80 and rod retaining clamp opening 82 to engage accessory support rod members 28 and secure thereto a beverage cooler 30 or tackle box 34 not otherwise provided with integral support rod clamp members by screwable affixment thereof, additionally with glueing if necessary, at appropriately spaced dispositions by means of auxiliary clamp screws 110 compressively communicating through auxiliary clamp screw openings 112 in the integral auxiliary clamp connecting member 114 into threaded openings 116 either provided or made at appropriately located positions within the beverage cooler 30 or tackle box 34 underside surface, wherein FIGS. 6 and 7 respectively show additional side elevation and corresponding end elevation detail of the auxiliary support rod clamp member 78 assembly above described.

The views shown in FIGS. 8 and 9 are respectively enlarged structural detail front elevation and top plan illustrations of the rod holder 88, wherein it will be noted the same is provided with an open bottom 118 to thereby enable supportable passage therethrough of the rod handle 120 as earlier shown in FIG. 1.

Lastly, the view shown in FIGS. 10 and 11 are respectively enlarged structural detail front elevation and top plan illustrations of the beverage container holder 96, wherein it will be noted the same is provided with a solid bottom 122 to thereby provide supportable retention of a beverage container placed therein.

Although the invention has been herein shown and described in what is conceived to be the most practical and preferred embodiments, it is recognized that departures may be made therefrom within the scope of the invention, which is not to be limited to the precise details herein but is to be accorded the full scope of the claims so as to embrace any and all equivalent devices and apparatus.

I claim:

1. A boat seat fishing accessory support assembly for a fishing boat having a boat seat provided with a boat deck-mounted pedestal upward swivelly supporting a seat connecting spider centrally intermediate thereof in turn receivably upward communicating disconnectably through a plurality of geometrically configured spider lobe openings individually a respectively corresponding plurality of bolts insertably through a respectively corresponding plurality of geometrically configured openings in a first upward disposed planar seat bottom of said boat seat to a second upward disposed planar seat cushion of said boat seat said seat cushion provided recessively within the underside planar surface thereof with a respectively corresponding plurality of geometrically configured threaded sockets individually adapted to receive by threadably inserted and compressively drawn communication therewithin said plurality of bolts, in combination with an attachment plate having a spaced set of downwardly disposed elongated tubular members integral thereto two opposing sides thereof and spatially adapted to communicably receive downwardly disposed therebetween said first upward disposed planar seat bottom when oriented such that said tubular members respectively parallelly align one said opposing side thereof with a forward edge of said boat seat and the other said opposing side thereof with a rearward edge of said boat seat and further adapted by means of a plurality of geometrically configured openings therein provided to insertably communicate individually therethrough said respectively corresponding plurality of bolts for threadably engaged and compressively drawn communication with said second upward disposed planar seat cushion recessively underside said planar surface disposed respectively corresponding plurality of geometrically configured threaded sockets such that said attachment plate is compressively secured in interposed disposition between said first upward disposed planar seat bottom and said second upward disposed planar seat cushion of said boat seat, a set of elongated leg U-shaped tubular members adapted for insertably disposed extensibly adjusted supportable retention within said spaced set of downwardly disposed elongated tubular members in bilateral disposition relative to said forward edge and said rearward edge of said boat seat, retention means to lockably engage said set of elongated leg U-shaped tubular members at an extensively adjusted disposition respectively end inward along the elongated leg portions thereof within said elongated tubular members, and clamp means adapted to detachably affix in upward supportable disposition to said set of elongated leg U-shaped tubular members either bilateral side of said boat seat a right bilaterally connected container and a left bilaterally connected container.

2. The boat seat fishing accessory support assembly according to claim 1 in which said plurality of geometrically configured openings are slotted to thereby enable adjustable inserted communication respectively therethrough said corresponding plurality of bolts.

3. The boat seat fishing accessory support assembly according to claim 1 in which said spaced set of downwardly disposed elongated tubular members are respectively provided with an inwardly extending first spaced plurality of openings transverse said downwardly disposed elongated tubular members either end thereof.

4. The boat seat fishing accessory support assembly according to claim 3 in which said set of elongated leg U-shaped tubular members are respectively provided with an inwardly extending second spaced plurality of openings transverse said tubular members respectively corresponding in spaced relationship to that of said first spaced plurality of openings.

5. The boat seat fishing accessory support assembly according to claim 4 in which said retention means are spring clips adapted to insertably communicate transversely through one of said first spaced plurality of openings and said second spaced plurality of openings when adjusted in extensive alignment.

6. The boat seat fishing accessory support assembly according to claim 1 in which said right bilaterally connected container is a tackle box.

7. The boat seat fishing accessory support assembly according to claim 6 in which said clamp means adapted to detachably affix said tackle box to said elongated leg U-shaped tubular members are integral thereto.

8. The boat seat fishing accessory support assembly according to claim 6 in which said clamp means adapted to detachably affix said tackle box to said elongated leg U-shaped tubular members are affixed by screw means thereto.

9. The boat seat fishing accessory support assembly according to claim 1 in which said left bilaterally connected container is a beverage cooler.

10. The boat seat fishing accessory support assembly according to claim 9 in which said clamp means adapted to detachably affix said beverage cooler to said elongated leg U-shaped tubular members are integral thereto.

11. The boat seat fishing accessory support assembly according to claim 10 in which said clamp means adapted to detachably affix said beverage cooler to said elongated leg U-shaped tubular members are affixed by screw means thereto.

12. The boat seat fishing accessory support assembly according to claim 9 in which said beverage cooler is provided with a laterally disposed set of angularly adjustable rod holders detachably affixed external thereto.

13. The boat seat fishing accessory support assembly according to claim 9 in which said beverage cooler is provided with a detachable beverage container holder affixed external thereto.

14. A boat seat fishing accessory support assembly for a fishing boat having a boat seat provided with a boat deck-mounted pedestal upward swivelly supporting a seat connecting plate centrally intermediate thereof in turn receivably upward communicating disconnectably through a plurality of geometrically configured seat connecting plate openings individually a respectively corresponding plurality of bolts insertably through a respectively corresponding plurality of geometrically configured openings in a first upward disposed planar seat bottom of said boat seat to a second upward disposed planar seat cushion of said boat seat said seat cushion provided recessively within the underside planar surface thereof with a respectively corresponding plurality of geometrically configured threaded sockets individually adapted to receive by threadably inserted and compressively drawn communication therewithin said plurality of bolts, in combination with an attachment plate having a spaced set of downwardly disposed elongated tubular members integral thereto two opposing sides thereof and spatially adapted to communicably receive downwardly disposed therebetween said first upward disposed planar seat bottom when oriented such that said tubular members respectively parallelly align one said opposing side thereof with a forward edge of said boat seat and the other said opposing side thereof with a rearward edge of said boat seat and further adapted by means of a plurality of geometrically configured openings therein provided to insertably communicate individually therethrough said respectively corresponding plurality of bolts for threadably engaged and compressively drawn communication with said second upward disposed planar seat cushion recessively underside said planar surface disposed respectively corresponding plurality of geometrically configured threaded sockets such that said attachment plate is compressively secured in interposed disposition between said first upward disposed planar seat bottom and said second upward disposed planar seat cushion of said boat seat, a set of elongated leg U-shaped tubular members adapted for insertably disposed extensibly adjusted supportable retention within said spaced set of downwardly disposed elongated tubular members in bilateral disposition relative to said forward edge and said rearward edge of said boat seat, retention means to lockably engage said set of elongated leg U-shaped tubular members at an extensively adjusted disposition respectively end inward along the elongated leg portions thereof within said elongated tubular members, and clamp means adapted to detachably affix in upward supportable disposition to said set of elongated leg U-shaped tubular members either bilateral side of said boat seat a right bilaterally connected container and a left bilaterally connected container.

15. The boat seat fishing accessory support assembly according to claim 14 in which said pluarlity of geometrically configured openings are slotted to thereby enable adjustable inserted communication respectively therethrough said corresponding plurality of bolts 16. The boat seat fishing accessory support assembly according to claim 14 in which said spaced set of downwardly disposed elongated tubular members are respectively provided with an inwardly extending first spaced plurality of openings transverse said downwardly disposed elongated tubular members either end thereof.

17. The boat seat fishing accessory support assembly according to claim 16 in which said set of elongated leg U-shaped tubular members are respectively provided with an inwardly extending second spaced plurality of openings transverse said tubular members respectively corresponding in spaced relationship to that of said first spaced plurality of openings.

18. The boat seat fishing accessory support assembly according to claim 17 in which said retention means are spring clips adapted to insertably communicate transversely through one of said first spaced plurality of openings and said second spaced plurality of openings when adjusted in extensive alignment.

19. The boat seat fishing accessory support assembly according to claim 14 in which said right bilaterally connected container is a tackle box.

20. The boat seat fishing accessory support assembly according to claim 19 in which said clamp means adapted to detachably affix said tackle box to said elongated leg U-shaped tubular members are integral thereto.

21. The boat seat fishing accessory support assembly according to claim 19 in which said clamp means adapted to detachably affix said tackle box to said elongated leg U-shaped tubular members are affixed by screw means thereto.

22. The boat seat fishing accessory support assembly according to claim 14 in which said left bilaterally connected container is a beverage cooler.

23. The boat seat fishing accessory support assembly according to claim 22 in which said clamp means adapted to detachably affix said beverage cooler to said elongated leg U-shaped tubular members are integral thereto.

24. The boat seat fishing accessory support assembly according to claim 23 in which said clamp means adapted to detachably affix said beverage cooler to said elongated leg U-shaped tubular members are affixed by screw means thereto.

25. The boat seat fishing accessory support assembly according to claim 22 in which said beverage cooler is provided with a laterally disposed set of angularly adjustable rod holders detachably affixed external thereto.

26. The boat seat fishing accessory support assembly according to claim 22 in which said beverage cooler is provided with a detachable beverage container holder affixed external thereto.

27. A boat seat arm rest support assembly for a fishing boat having a boat seat provided with a back rest therefor and assembled swivelly upon a boat deck-mounted pedestal upward supporting a seat connecting spider centrally intermediate thereof in turn receivably upward communicating disconnectably through a plurality of geometrically configured spider lobe openings individually a respectively corresponding plurality of bolts insertably through a respectively corresponding plurality of geometrically configured openings in a first upward disposed planar seat bottom of said boat seat to a second upward disposed planar seat cushion of said boat seat said seat cushion provided recessively within the underside planar surface thereof with a respectively corresponding plurality of geometrically configured threaded sockets individually adapted to receive by threadably inserted and compressively drawn communication therewithin said plurality of bolts, in combination with an attachment plate having a spaced set of downwardly disposed elongated tubular members integral thereto two opposing sides thereof and spatially adapted to communicably receive downwardly disposed therebetween said first upward disposed planar seat bottom when oriented such that said tubular members respectively parallely align one said opposing side thereof with a forward edge of said boat seat and the other said opposing side thereof with a rearward edge of said boat seat and further adapted by means of a plurality of geometrically configured openings therein provided to insertably communicate individually therethrough said respectively corresponding plurality of bolts for threadably engaged and compressively drawn communication with said second upward disposed planar seat cushion recessively underside said planar surface disposed respectively corresponding plurality of geometrically configured threaded sockets such that said attachment plate is compressively secured in interposed disposition between said first upward disposed planar seat bottom and said second upward disposed planar seat cushion of said boat seat, a set of upward bent U-shaped tubular members each in turn having a spaced set of legs extending unidirectionally normal to one side of said upward bent U-shaped tubular members respectively opposing sides one side thereof and adapted to communicate said legs for insertably disposed extensibly adjusted supportable retention within said spaced set of downwardly disposed elongated tubular members in bilateral disposition relative to said forward edge and said rearward edge of said boat seat, retention means to lockably engage said spaced set of legs respectively of said set of upward bent U-shaped tubular members at an extensively adjusted disposition respectively end inward along the spaced set of legs portions thereof within said elongated tubular members, and an arm rest support surface assembled each interconnecting tubular portion said set of upward bent U-shaped tubular members.

28. The boat seat arm rest support assembly according to claim 27 in which said plurality of geometrically configured openings are slotted to thereby enable adjustable inserted communication respectively therethrough said corresponding plurality of bolts.

29. The boat seat arm rest support assembly according to claim 27 in which said spaced set of downardly disposed elongated tubular members are respectively provided with an inwardly extending first spaced plurality of openings transverse said downwardly disposed elongated tubular members either end thereof.

30. The boat seat arm rest support assembly according to claim 29 in which said spaced set of legs of said set of upward bent U-shaped tubular members are respectively provided with an upwardly extending second spaced plurality of openings transverse said legs respectively corresponding in spaced relationship to that of said first spaced plurality of openings.

31. The boat seat arm rest support assembly according to claim 30 in which said retention means are spring clips adapted to insertably communicate transversely through one of said first spaced plurality of openings and said second spaced plurality of openings when adjusted in extensive alignment.

32. A boat seat arm rest support assembly for a fishing boat having a boat seat provided with a back rest therefor and assembled swivelly upon a boat deck-mounted pedestal upward supporting a seat connecting plate centrally intermediate thereof in turn receivably upward communicating disconnectably through a plurality of geometrically configured seat connecting plate openings individually a respectively corresponding plurality of bolts insertably through a respectively corresponding plurality of geometrically configured openings in a first upward disposed planar seat bottom of said boat seat to a second upward disposed planar seat cushion of said boat seat said seat cushion provided recessively within the underside planar surface thereof with a respectively corresponding plurality of geometrically configured threaded sockets individually adapted to receive by threadably inserted and compressively drawn communication therewithin said plurality of bolts, in combination with an attachment plate having a spaced set of downwardly disposed elongated tubular members integral thereto two opposing sides thereof and spatially adapted to communicably receive downwardly disposed therebetween said first upward disposed planar seat bottom when oriented such that said tubular members respectively parallelly align one said opposing side thereof with a forward edge of said boat seat and the other said opposing side thereof with a rearward edge of said boat seat and further adapted by means of a plurality of geometrically configured openings therein provided to insertably communicate individually therethrough said respectively corresponding plurality of bolts for threadably engaged and compressively drawn communication with said second upward disposed planar seat cushion recessively underside said planar surface disposed respectively corresponding plurality of geometrically configured threaded sockets such that said attachment plate is compressively secured in interposed disposition between said first upward disposed planar seat bottom and said second upward disposed planar seat cushion of said boat seat, a set of upward bent U-shaped tubular members each in turn having a spaced set of legs extending unidirectionally normal to one side of said upward bent U-shaped tubular members respectively opposing sides one side thereof and adapted to communicate said legs for insertably disposed extensibly adjusted supportable retention within said spaced set of downwardly disposed elongated tubular members in bilateral disposition relative to said forward edge and said rearward edge of said boat seat, retention means to lockably engage said spaced set of legs respectively of said set of upward bent U-shaped tubular members at an extensively adjusted disposition respectively end inward along the spaced set of legs portions thereof within said elongated tubular members, and an arm rest support surface assembled each interconnecting tubular portion said set of upward bent U-shaped tubular members.

33. The boat seat arm rest support assembly according to claim 32 in which said plurality of geometrically configured openings are slotted to thereby enable adjustable inserted communication respectively therethrough said corresponding plurality of bolts.

34. The boat seat arm rest support assembly according to claim 32 in which said spaced set of downwardly disposed elongated tubular members are respectively provided with an inwardly extending first spaced plurality of openings transverse said downwardly disposed elongated tubular members either end thereof.

35. The boat seat arm rest support assembly according to claim 34 in which said spaced set of legs of said set of upward bent tubular members are respectively provided with an inwardly extending second spaced plurality of openings transverse said legs respectively corresponding in spaced relationship to that of said first spaced plurality of openings.

36. The boat seat arm rest support assembly according to claim 35 in which said retention means are spring clips adapted to insertably communicate transversely through one of said first spaced plurality of openings and said second spaced plurality of openings when adjusted in extensive alignment.

* * * * *